(12) United States Patent
Fujiwara et al.

(10) Patent No.: US 8,592,513 B2
(45) Date of Patent: Nov. 26, 2013

(54) ELASTOMER COMPOSITION AND STORAGE COVER OF AIRBAG DEVICES

(75) Inventors: Masahiro Fujiwara, Tokyo (JP); Takahiro Hisasue, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 496 days.

(21) Appl. No.: 12/921,180

(22) PCT Filed: Mar. 24, 2009

(86) PCT No.: PCT/JP2009/055837
§ 371 (c)(1),
(2), (4) Date: Sep. 7, 2010

(87) PCT Pub. No.: WO2009/119592
PCT Pub. Date: Oct. 1, 2009

(65) Prior Publication Data
US 2011/0015333 A1    Jan. 20, 2011

(30) Foreign Application Priority Data

Mar. 25, 2008 (JP) .................. 2008-078826

(51) Int. Cl.
*C08L 53/00* (2006.01)
*C09J 7/02* (2006.01)

(52) U.S. Cl.
USPC ...................................... 524/505

(58) Field of Classification Search
USPC ...................................... 524/505
See application file for complete search history.

(56) References Cited

U.S. PATENT DOCUMENTS

| | | | |
|---|---|---|---|
| 3,265,765 A | 8/1966 | Holden et al. | |
| 3,333,024 A | 7/1967 | Haefele et al. | |
| 3,830,767 A | 8/1974 | Condon | |
| 4,006,116 A | 2/1977 | Dominguez | |
| 4,334,699 A | 6/1982 | Patzelt et al. | |
| 4,673,714 A | 6/1987 | Kishimoto et al. | |
| 5,358,986 A | 10/1994 | Onofusa et al. | |
| 6,176,510 B1 | 1/2001 | Masubuchi et al. | |
| 6,316,068 B1 | 11/2001 | Masubuchi et al. | |
| 2004/0039128 A1* | 2/2004 | Sasagawa et al. | 525/331.9 |
| 2005/0119414 A1* | 6/2005 | Sasagawa et al. | 525/242 |
| 2007/0029530 A1* | 2/2007 | Noda et al. | 252/511 |
| 2011/0003928 A1 | 1/2011 | Shimizu et al. | |

FOREIGN PATENT DOCUMENTS

| | | |
|---|---|---|
| EP | 0 323 741 | 7/1989 |
| EP | 0 902 051 | 3/1999 |
| EP | 0 918 070 | 5/1999 |
| JP | 40-023798 | 10/1965 |
| JP | 42-008704 | 4/1967 |
| JP | 43-006636 | 3/1968 |
| JP | 50-14742 | 2/1975 |
| JP | 50-127336 | 10/1975 |
| JP | 52-65551 | 5/1977 |
| JP | 55-110643 | 8/1980 |
| JP | 58-206644 | 12/1983 |
| JP | 60-220147 | 11/1985 |
| JP | 61-033132 | 2/1986 |
| JP | 62-207303 | 9/1987 |
| JP | 1-202550 | 8/1989 |
| JP | 5-38996 | 2/1993 |
| JP | 5-171002 | 7/1993 |
| JP | 07-053789 | 2/1995 |
| JP | 11-172070 | 6/1999 |
| JP | 11-209559 | 8/1999 |
| JP | 11-335433 | 12/1999 |
| JP | 2000-247200 | 9/2000 |
| JP | 2001-19829 | 1/2001 |
| JP | 2004-002608 | 1/2004 |
| JP | 2005-272527 | 10/2005 |
| WO | 97/31977 | 9/1997 |

OTHER PUBLICATIONS

Database WPI, Week 200421, Thomson Scientific, London, GB; AN 2004-217266, XP-002624037 & JP 2003-277575 A (Riken Vinyl Kogyo KK), Oct. 2, 2003 (Abstract).
Database WPI, Week 200438, Thomson Scientific, London, GB; AN 2004-403130, XP-002624038 & JP 2003-286384 A (Riken Vinyl Kogyo KK), Oct. 10, 2003 (Abstract).
Database WPI, Week 200103, Thomson Scientific, London, GB; AN 2001-019448, XP-002624039 & JP 2000-281862 A (Asahi Kasei KK), Oct. 10, 2000 (Abstract).
Supplementary European Search Report for European Patent Application No. 09724601.1, dated Mar. 2, 2011.
*Thermoplastic Elastomers*, 2nd Edition, Edited by G. Holden et al., pp. 298-305, 1996.
International Search Report for PCT/JP2009/055837, mailed Jun. 9, 2009.
International Preliminary Report on Patentability for PCT/JP2009/055837, issued Nov. 9, 2010.
English language Abstract for GB 1020720, corresponding to JP 42-008704 published Apr. 20, 1967.

* cited by examiner

Primary Examiner — Angela C Scott
(74) *Attorney, Agent, or Firm* — Greenblum & Bernstein, P.L.C.

(57) ABSTRACT

The present invention provides an elastomer composition comprising a mixture (a) of a hydrogenated block copolymer (a-1) and a hydrogenated block copolymer (a-2); a polypropylene resin (b); and a hydrocarbon oil (c). The hydrogenated block copolymer (a-1) has a specific structure, a specified number average molecular weight and a specified block content. The hydrogenated block copolymer (a-2) has a specific structure, a specified number average molecular weight, a specified block content, a specified vinyl bond content before hydrogenation and a specified MFR. The polypropylene resin (b) has a specified MFR. The present invention also provides a storage cover of airbag devices which is made of the elastomer composition.

10 Claims, No Drawings

ELASTOMER COMPOSITION AND STORAGE COVER OF AIRBAG DEVICES

TECHNICAL FIELD

The present invention relates to an elastomer composition and a storage cover of airbag devices.

BACKGROUND ART

In recent years, thermoplastic elastomers having excellent productivity are increasingly used as automobile parts, home electrical appliance parts, medical parts and general merchandise applications, which used to be mainly made of a vulcanized rubber. Examples of the thermoplastic elastomers include an olefin elastomer consisting of an ethylene-propylene copolymer and polypropylene, a polyurethane elastomer and soft polyvinyl chloride.

However, under the circumstances, the above-mentioned thermoplastic elastomers have disadvantages in respect of scratch resistance, flexibility, processability, economical efficiency and recycling efficiency.

That is, although the olefin elastomer is relatively inexpensive, and has excellent weatherability and heat resistance, the olefin elastomer has inferior flexibility and scratch resistance.

Although the polyurethane elastomer has excellent scratch resistance, the polyurethane elastomer has disadvantages that it has inferior flexibility and weatherability and is expensive.

Although the soft polyvinyl chloride is relatively inexpensive and has excellent weatherability and scratch resistance, the soft polyvinyl chloride has disadvantages that it has inferior low-temperature flexibility and recycling efficiency.

Various techniques are proposed for an elastomer composition using a hydrogenated derivative of a copolymer of a vinyl aromatic compound—a conjugated diene compound (hereafter, sometimes abbreviated as a hydrogenated block copolymer). For example, Patent Documents 1 to 3 disclose a composition obtained by blending a rubber softener and an olefin resin with a hydrogenated block copolymer (for example, see the following Patent Documents 1 to 3).

An airbag system includes a collision sensing device for detecting the collision of a high-speed movable body, and an airbag device in principle. The latter airbag device includes an airbag, a gas generator for generating a gas inflating the airbag, a storage cover for storing the airbag and the gas generator, and a bracket (retainer) for mounting the storage cover on the gas generator.

The airbag device is mounted on the front side of an occupant moving at high speed. When the collision sensing device is operated by collision, a gas is momentarily generated from the gas generator. The airbag folded and stored in a space surrounded with the gas generator, the storage cover and the bracket is filled with the gas. The storage cover is deployed by the pressure of the gas with which the airbag is filled. The airbag is momentarily released and expanded to the front side of the occupant from an opening part obtained by the deployment to restrain the occupant to the seat side. As a result, the airbag prevents the occupant from being injured by collision with a steering device and a dashboard panel or the like.

Therefore, the storage cover of airbag devices must be certainly deployed without scattering fragments which may wound the occupant, and release the bag momentarily when a collision accident or the like occurs to operate the gas generator.

A storage cover of airbag devices made of an urethane resin containing reinforcing nets which is mainly made of nylon is proposed (for example, see Patent Documents 4, 5).

A storage cover is proposed, which has a structure where a surface layer made of a soft material having a JIS K6301 A hardness of 30 to 70 and a core layer made of a hard resin having elasticity are integrally formed and a cleavage slit is formed in the core layer (for example, see Patent Document 6).

A storage cover of airbag devices is proposed, which is made of a thermoplastic elastomer composition with a JIS K6301 A hardness of 60 to 85 containing a hydrogenated styrene-conjugated diene block copolymer as a main component (for example, see Patent Document 7).

A thermoplastic elastomer composition is proposed, which contains two kinds of hydrogenated styrene-conjugated diene block copolymers having a comparatively low-molecular weight as a main component (for example, see Patent Document 8). A thermoplastic elastomer composition is proposed, which contains a hydrogenated styrene-conjugated diene block copolymer having a high-molecular weight and a hydrogenated styrene-conjugated diene block copolymer having a comparatively low-molecular weight as a main component and it is suggested that this composition can be used for a storage cover of airbag devices (for example, see Patent Document 9).

Patent Document 1: Japanese Patent Application Laid-Open No. 50-14742
Patent Document 2: Japanese Patent Application Laid-Open No. 52-65551
Patent Document 3: Japanese Patent Application Laid-Open No. 58-206644
Patent Document 4: Japanese Patent Application Laid-Open No. 50-127336
Patent Document 5: Japanese Patent Application Laid-Open No. 55-110643
Patent Document 6: Japanese Patent Application Laid-Open No. 1-202550
Patent Document 7: Japanese Patent Application Laid-Open No. 5-38996
Patent Document 8: National Publication of International Patent Application No. 9-530779
Patent Document 9: Japanese Patent Application Laid-Open No. 11-209559

DISCLOSURE OF THE INVENTION

Problems to be Solved by the Invention

However, the compositions described in Patent Documents 1 to 3 have disadvantages that they have inferior scratch resistance as in the olefin elastomer.

Since the airbag storage covers described in Patent Documents 4 and 5 have the reinforcing nylon nets, the airbag storage covers solve the problems that cracks are generated in a part other than a cleavage part in the deployment and the covers are partially scattered. However, the airbag storage covers have problems that it takes time to incorporate the reinforcing nets in the molding and the positions of the reinforcing nets are displaced to have the disadvantage that they have inferior productivity.

The storage cover disclosed in Patent Document 6 has some degree of stiffness to preferably apply a moderate feel to the occupant in the deployment. However, since the storage cover requires two-layer molding of the core layer and the surface layer, the storage cover has problems that it requires an expensive multilayer molding machine having two injecting mechanisms. Additionally, since the soft material as the surface layer has poor surface scuff properties (scratch resistance), it is necessary to coat the surface after carrying out the two-layer molding. Thus, the storage cover has also the problem of the cost rise.

The cover disclosed in Patent Document 7 moderately applies a flexible feel to the occupant and can be preferably applied in a wide temperature range. However, since the cover has a surface having poor scratch resistance, it is necessary to coat the surface after injection molding. Thus, the cover has the problem of the cost rise.

The techniques disclosed in Patent Documents 8 and 9 also remain insufficient for obtaining the storage cover of airbag devices having an excellent balance of physical properties and excellent deployment performance (low-temperature characteristics) under low temperature conditions.

In the light of the aforementioned circumstances, it is an object of the present invention to considerably improve the compatibility of a hydrogenated block copolymer and a polypropylene resin to provide an elastomer composition having improved appearance characteristics, scratch resistance and low-temperature characteristics while employing the characteristics of the hydrogenated block copolymer having excellent flexibility, weatherability, heat resistance, strength and molding processability, and a storage cover of airbag devices made of the elastomer composition, at low cost.

Means for Solving the Problems

The present inventors have conducted earnest studies in order to solve the problems of the conventional techniques. As a result, the present inventors have found that an elastomer composition which comprises a hydrogenated block copolymer mixture comprising two kinds of specific hydrogenated block copolymers and a polypropylene resin at a specific ratio can solve the above-mentioned problems. The present invention was accomplished based on this finding.

That is, the present invention is as follows.

[1] An elastomer composition comprising:
(a) a hydrogenated block copolymer mixture comprising hydrogenated block copolymers (a-1) and (a-2): 100 parts by mass,
(a-1):
  a hydrogenated block copolymer (a-1), obtained by hydrogenating a block copolymer comprising
  at least two polymer blocks A comprising a vinyl aromatic compound as a main component and
  at least one polymer block B comprising a conjugated diene compound as a main component,
  wherein a number average molecular weight is more than 200,000 and 400,000 or less, and a content of the polymer blocks A is 15 to 40% by mass: 10 to 60 parts by mass,
(a-2):
  a hydrogenated block copolymer (a-2), obtained by hydrogenating a block copolymer comprising
  at least one polymer block A comprising a vinyl aromatic compound as a main component and
  at least one polymer block B comprising a conjugated diene compound as a main component,
  wherein a number average molecular weight is more than 30,000 and 140,000 or less, a content of the polymer block A is 10 to 25% by mass, a vinyl bond content in the conjugated diene compound before hydrogenation is 40 to 60 mol %, and the hydrogenated block copolymer (a-2) has a melt flow rate value (MFR) of 0.1 g/10 minutes or more and less than 30 g/10 minutes, as determined at 230° C. under a load of 2.16 kg in accordance with ASTM D1238: 40 to 90 parts by mass;
(b) a polypropylene resin having a melt flow rate value (MFR) of 5 g/10 minutes or more and 100 g/10 minutes or less, as determined at 230° C. under a load of 2.16 kg in accordance with ASTM D1238: 30 to 125 parts by mass; and
(c) a hydrocarbon oil: 0 to 60 parts by mass.

[2] The elastomer composition according to the item [1], wherein the vinyl bond content in the conjugated diene compound before hydrogenation of the hydrogenated block copolymer (a-2) is more than 50 mol % and 60 mol % or less.

[3] The elastomer composition according to the item [1] or [2], wherein a crystal melting heat quantity (ΔH) of the hydrogenated block copolymer (a-2) is less than 0.5 J/g.

[4] The elastomer composition according to any one of the items [1] to [3], wherein the crystal melting heat quantity (ΔH) of the hydrogenated block copolymer (a-2) is less than 0.1 J/g.

[5] The elastomer composition according to any one of items [1] to [4], wherein the vinyl bond content in the conjugated diene compound before hydrogenation of the hydrogenated block copolymer (a-1) is less than 40 mol %.

[6] The elastomer composition according to any one of the items [1] to [5], wherein the polypropylene resin (b) is a propylene homopolymer having a bending elastic modulus of 800 MPa or more and/or a copolymer of propylene and α-olefin having 2 to 8 carbon atoms.

[7] A storage cover of airbag devices made of the elastomer composition according to any one of items [1] to [6].

Advantage of the Invention

The present invention can provide an elastomer composition having improved appearance characteristics, scratch resistance and low-temperature characteristics while employing the characteristics of a hydrogenated block copolymer having excellent flexibility, weatherability, heat resistance, strength and molding processability.

The present invention can provide a storage cover of airbag devices having excellent scratch resistance, appearance characteristics and low-temperature cover deployment performance by using the elastomer composition having the above-mentioned characteristics.

BEST MODE FOR CARRYING OUT THE INVENTION

Hereinafter, best mode for carrying out the invention (hereinafter, referred to as "the present embodiment") will be described in detail. The present invention is not limited to the following embodiment. Various modifications within the scope of the present invention are possible.

An elastomer composition of the present embodiment comprises:
(a) a hydrogenated block copolymer mixture comprising hydrogenated block copolymers (a-1) and (a-2): 100 parts by mass,
(a-1):
  a hydrogenated block copolymer (a-1), obtained by hydrogenating a block copolymer comprising
  at least two polymer blocks A comprising a vinyl aromatic compound as a main component and
  at least one polymer block B comprising a conjugated diene compound as a main component,
  wherein a number average molecular weight is more than 200,000 and 400,000 or less, and a content of the polymer blocks A is 15 to 40% by mass: 10 to 60 parts by mass, (a-2):
a hydrogenated block copolymer (a-2), obtained by hydrogenating a block copolymer comprising
at least one polymer block A comprising a vinyl aromatic compound as a main component and
at least one polymer block B comprising a conjugated diene compound as a main component,
wherein a number average molecular weight is more than 30,000 and 140,000 or less, a content of the polymer block A is 10 to 25% by mass, a vinyl bond content in the conjugated diene compound before hydrogenation is 40 to 60 mol %, and the hydrogenated block copolymer (a-2) has a melt flow rate value (MFR) of 0.1 g/10 minutes or more and less than 30 g/10 minutes, as determined at 230° C. under a load of 2.16 kg in accordance with ASTM D1238: 40 to 90 parts by mass;
(b) a polypropylene resin having a melt flow rate value (MFR) of 5 g/10 minutes or more and 100 g/10 minutes or less, as determined at 230° C. under a load of 2.16 kg in accordance with ASTM D1238: 30 to 125 parts by mass; and
(c) a hydrocarbon oil: 0 to 60 parts by mass.

Hereinafter, each of the components will be described.

[Component (a)]

The hydrogenated block copolymer mixture as the component (a) is a mixture of the hydrogenated block copolymers (a-1) and (a-2) to be described later.

In the present embodiment, "comprise . . . as a main component" means that a ratio of the monomer unit in a polymer block is 50% by mass or more, and preferably 70% by mass or more. For example, "the polymer block A comprising a vinyl aromatic compound as a main component" means that a ratio of the vinyl aromatic compound unit in the polymer block is 50% by mass or more, and preferably 70% by mass or more.

[Component (a-1)]

The hydrogenated block copolymer (a-1) is a hydrogenated block copolymer obtained by hydrogenating a block copolymer comprising at least two polymer blocks A comprising a vinyl aromatic compound as a main component and at least one polymer block B comprising a conjugated diene compound as a main component. The hydrogenated block copolymer has a number average molecular weight of more than 200,000 and 400,000 or less. A content of the polymer blocks A is 15 to 40% by mass.

Examples of the vinyl aromatic compound include styrene, α-methylstyrene, vinyltoluene and p-tertiary butylstyrene. Styrene is particularly preferable. These vinyl aromatic compounds may be used singly or in combination of two or more kinds thereof.

Examples of the conjugated diene compound include butadiene, isoprene, 1,3-pentadiene and 2,3-dimethyl-1,3-butadiene. Of these, butadiene, isoprene and a combination thereof are preferable. These conjugated diene compounds may be used singly or in combination of two or more kinds thereof.

The hydrogenated block copolymer (a-1) has a number average molecular weight of more than 200,000 and 400,000 or less, preferably 220,000 or more and 350,000 or less, and more preferably 250,000 or more and 300,000 or less.

As described above, a content of the polymer blocks A is 15 to 40% by mass of the hydrogenated block copolymer (a-1), and preferably 20 to 35% by mass.

When the number average molecular weight of the hydrogenated block copolymer (a-1) is 200,000 or less, the strength and heat resistance of the elastomer composition of the present embodiment tend to be reduced. On the other hand, when the number average molecular weight of the hydrogenated block copolymer (a-1) is more than 400,000, the molding processability (flowability) of the elastomer composition tends to be reduced, and the outer appearance of a molded article tends to be degraded (a flow mark tends to be generated).

When the content of the polymer blocks A is less than 15% by mass of the hydrogenated block copolymer (a-1), the strength and heat resistance of the elastomer composition tend to be reduced. On the other hand, the content of the polymer blocks A is more than 40% by mass of the hydrogenated block copolymer (a-1), the scratch resistance and flexibility of the elastomer composition tend to be reduced, and the molding processability and the low-temperature characteristics tend to be reduced.

The vinyl bond content in the conjugated diene compound before hydrogenation of the hydrogenated block copolymer (a-1) is preferably less than 40 mol %, and more preferably 25 mol % or more and less than 40 mol % in views of the strength of the obtained composition and the compatibility with polypropylene.

[Component (a-2)]

The hydrogenated block copolymer (a-2) is a hydrogenated block copolymer obtained by hydrogenating a block copolymer comprising at least one polymer block A comprising a vinyl aromatic compound as a main component and at least one polymer block B comprising a conjugated diene compound as a main component.

The hydrogenated block copolymer (a-2) has a number average molecular weight of more than 30,000 and 140,000 or less.

The polymer block A constitutes 10 to 25% by mass of the hydrogenated block copolymer (a-2), and the vinyl bond content in the conjugated diene compound before hydrogenation is 40 to 60 mol %.

The hydrogenated block copolymer (a-2) has a melt flow rate value (MFR) of 0.1 g/10 minutes or more and less than 30 g/10 minutes. The melt flow rate value is determined at 230° C. under a load of 2.16 kg in accordance with ASTM D1238.

Examples of the vinyl aromatic compound include styrene, α-methylstyrene, vinyltoluene and p-tertiary butylstyrene. Styrene is particularly preferable. These vinyl aromatic compounds may be used singly or in combination of two or more kinds thereof.

Examples of the conjugated diene compound include butadiene, isoprene, 1,3-pentadiene and 2,3-dimethyl-1,3-butadiene. Of these, butadiene, isoprene and a combination thereof are preferable. These conjugated diene compounds may be used singly or in combination of two or more kinds thereof.

As described above, the hydrogenated block copolymer (a-2) has a number average molecular weight of more than 30,000 and 140,000 or less, preferably 50,000 or more and 120,000 or less, and more preferably 60,000 or more and 100,000 or less.

As described above, a content of the polymer blocks A is 10 to 25% by mass of the hydrogenated block copolymer (a-2), and preferably 12 to 20% by mass.

When the number average molecular weight of the hydrogenated block copolymer (a-2) is 30,000 or less, the strength and heat resistance of the elastomer composition tend to be reduced. On the other hand, when the number average molecular weight of the hydrogenated block copolymer (a-2) is more than 140,000, the molding processability (flowability) of the elastomer composition tends to be reduced, and the outer appearance of a molded article tends to be degraded (a flow mark tends to be generated).

When the content of the polymer blocks A is less than 10% by mass of the hydrogenated block copolymer (a-2), the strength and heat resistance of the elastomer composition tend to be reduced. On the other hand, the content of the polymer blocks A is more than 25% by mass of the hydrogenated block copolymer (a-2), the scratch resistance and flexibility of the elastomer composition tend to be reduced.

As described above, the vinyl bond content in the conjugated diene compound before hydrogenation of the hydrogenated block copolymer (a-2) is 40 to 60 mol %, preferably 45 to 60 mol %, and more preferably more than 50 mol % and 60 mol % or less. When the vinyl bond content is less than 40 mol %, the low-temperature characteristics of the elastomer composition tends to be reduced. When the vinyl bond content is more than 60 mol %, the strength of the elastomer composition tends to be reduced.

A crystal melting heat quantity ($\Delta H$) of the hydrogenated block copolymer (a-2) is preferably less than 0.5 J/g, more preferably less than 0.1 J/g, and still more preferably 0.05 J/g.

When the crystal melting heat quantity ($\Delta H$) is 0.5 J/g or more, the embrittlement temperature of the elastomer composition of the present embodiment tends to be increased to degrade the low-temperature characteristics.

The crystal melting heat quantity ($\Delta H$) is determined by a DSC (differential scanning calorimeter) method.

It is generally known that, for example, when a 1,2-vinyl bond content in a polymer block comprising a butadiene monomer unit as a main component before hydrogenation is 60 mol % or more, the crystal of the hydrogenated block copolymer disappears (G. Holden, Thermoplastic Elastomers 2nd Edition P301).

In this view, the present inventors expectantly considered that the performance of a hydrogenated block copolymer as an elastomer is enhanced by causing the crystal of the hydrogenated block copolymer disappear, and a composition comprising the hydrogenated block copolymer exhibits an excellent balance of physical properties.

However, the present inventors found that a range of 60 mol % or more of the 1,2-vinyl bond content, where the crystal disappears, cannot reduce the embrittlement temperature of the composition comprising the hydrogenated block copolymer, and is unsuitable for a use requiring excellent characteristics at a low temperature condition.

The present inventors further considered in accordance with a novel concept that a composition comprising a hydrogenated copolymer, which has a 1,2-vinyl bond content in a polymer block comprising a butadiene monomer unit as a main component before hydrogenation of 60 mol % or less, in which a crystal is caused to disappear, has a greatly-improved balance of mechanical properties.

As a result, the present inventors have surprisingly discovered that a hydrogenated block copolymer having a 1,2-vinyl bond content in the range of 40 to 60 mol % where the crystal exists in ordinary circumstances, and having a crystal melting heat quantity of less than the specified value has no crystal or has an extremely small degree of crystallinity even if the hydrogenated block copolymer has the crystal, and the composition comprising the hydrogenated block copolymer has a remarkably enhanced balance of physical properties.

The crystal melting heat quantity ($\Delta H$) of the hydrogenated block copolymer (a-2) can be adjusted by setting the peak temperature of the internal temperature of a reactor and the difference between the maximum temperature and the minimum temperature in the reactor in polymerizing the polymer block B comprising conjugated diene as a main component to the specific range.

Specifically, when a temperature width ($\Delta T$) which is the difference between the maximum temperature and the minimum temperature in the reactor is 20° C. or less, the crystal melting heat quantity ($\Delta H$) of the finally obtained hydrogenated block copolymer is reduced.

The peak temperature of the internal temperature of the reactor is preferably set to be 90° C. or less. In order to set the peak temperature of the internal temperature of the reactor to be 90° C. or less and to set the temperature width ($\Delta T$) in the reactor to be 20° C. or less, it is necessary to remove reaction heat by cooling.

When the peak temperature is more than 90° C. or the temperature width ($\Delta T$) is more than 20° C., the crystal melting heat quantity ($\Delta H$) tends to be increased to increase the embrittlement temperature of the finally obtained elastomer composition and to degrade the low-temperature characteristics.

It is more preferable that the peak temperature of the internal temperature of the reactor is 85° C. or less, and the temperature width ($\Delta T$) is 15° C. or less. It is still more preferable that the peak temperature of the internal temperature of the reactor is 80° C. or less, and the temperature width ($\Delta T$) is 10° C. or less.

The melt flow rate (MFR) of the hydrogenated block copolymer (a-2) is 0.1 g/10 minutes or more and less than 30 g/10 minutes, preferably 0.1 g/10 minutes or more and less than 15 g/10 minutes, and more preferably 1.0 g/10 minutes or more and less than 10 g/10 minutes when the melt flow rate is measured at 230° C. under a load of 2.16 kg in accordance with ASTM D1238.

When the MFR is less than 0.1 g/10 minutes, the molding processability of the elastomer composition tends to be degraded. When the MFR is 30 g/10 minutes or more, the elongation of the elastomer composition tends to be reduced.

The molecular weight distribution (a ratio (Mw/Mn) of a weight average molecular weight (Mw) to a number average molecular weight (Mn)) of the hydrogenated block copolymer (a-1) and the hydrogenated block copolymer (a-2) is preferably 5 or less, more preferably 2 or less, and still more preferably 1.5 or less.

When the molecular weight distribution is more than 5, the elastomer composition may have practically insufficient strength and heat resistance.

Herein, the number average molecular weight, weight average molecular weight and molecular weight distribution of the hydrogenated block copolymers (a-1) and (a-2) can be measured by GPC (Gel Permeation Chromatograpy) method.

In the GPC analysis, the number average molecular weight and the weight average molecular weight can be calculated using a calibration curve obtained with respect to standard polystyrene.

As described above, the hydrogenated block copolymer (a-1) is the hydrogenated block copolymer obtained by hydrogenating the block copolymer comprising at least two polymer blocks A comprising the vinyl aromatic compound as a main component and at least one polymer block B comprising the conjugated diene compound as a main component. Examples thereof include those having structures such as A-B-A, B-A-B-A, A-B-A-B-A and B-A-B-A-B.

As described above, the hydrogenated block copolymer (a-2) is the hydrogenated block copolymer obtained by hydrogenating the block copolymer comprising at least one polymer block A comprising the vinyl aromatic compound as a main component and at least one polymer block B comprising the conjugated diene compound as a main component. Examples thereof include those having structures such as A-B, A-B-A, B-A-B-A, A-B-A-B-A and B-A-B-A-B.

Even if the hydrogenated block copolymer (a-2) has the A-B type structure, the elastomer composition having good scratch resistance tends to be obtained. In view of further enhancing the strength and heat resistance of the elastomer composition, particularly preferred hydrogenated block copolymer (a-2) is a hydrogenated block copolymer obtained by hydrogenating a block copolymer comprising at least two polymer blocks A comprising a vinyl aromatic compound as a main component and at least one polymer block B comprising a conjugated diene compound as a main component. For example, those having the structures of A-B-A, B-A-B-A, A-B-A-B-A and B-A-B-A-B are preferable. In view of enhancing the balance of the flexibility and strength of the elastomer composition, that having the structure of A-B-A is preferable.

In the polymer block A comprising a vinyl aromatic compound as a main component and the polymer block B comprising a conjugated diene compound as a main component in the hydrogenated block copolymers (a-1) and (a-2), the distribution of the vinyl aromatic compound or the conjugated diene compound in each of the polymer blocks may be random, tapered (a monomer component is increased or decreased along a molecule chain), or a partial block type. Alternatively, they may be optionally combined.

When the hydrogenated block copolymers (a-1) and (a-2) have two or more polymer blocks A and two or more polymer blocks B, each polymer block A may have the same structure or the different structure to each other, and each polymer block B may have the same structure or the different structure to each other.

The blending ratio of the hydrogenated block copolymer (a-1) and the hydrogenated block copolymer (a-2) in the elastomer composition of the present embodiment will be described. When the total amount of the hydrogenated block copolymer mixture (a) is defined as 100 parts by mass, the amount of the hydrogenated block copolymer (a-1) is 10 to 60 parts by mass, and the amount of the hydrogenated block copolymer (a-2) is 40 to 90 parts by mass. Preferably, the amount of the hydrogenated block copolymer (a-1) is 20 to 50 parts by mass, and the amount of the hydrogenated block copolymer (a-2) is 50 to 80 parts by mass.

When the amount of the hydrogenated block copolymer (a-1) is less than 10 parts by mass, the strength and heat resistance of the elastomer composition tends to be reduced. When the amount of the hydrogenated block copolymer (a-1) is more than 60 parts by mass, the molding processability (flowability) of the elastomer composition tends to be reduced, and the outer appearance of a molded article tends to be degraded (a flow mark tends to be generated).

[Producing Method of Hydrogenated Block Copolymer (a-1)]

As long as the hydrogenated block copolymer (a-1) has the above-mentioned structure, a producing method thereof is not limited. For example, a block copolymer of a vinyl aromatic compound—a conjugated diene compound before hydrogenation can be synthesized in an inactive solvent using a lithium catalyst as in a method described in Japanese Patent Publication No. 40-23798.

Examples of the hydrogenation method include methods described in Japanese Patent Publication Nos. 42-8704 and 43-6636, and Japanese Patent Application Laid-Open Nos. 60-220147, 61-33132 and 62-207303.

In that case, the hydrogenation is adjusted so that 80% or more, and preferably 90% or more of aliphatic double bonds derived from the conjugated diene compound are hydrogenated. On the other hand, the hydrogenation is adjusted so that less than 20%, and preferably less than 10% of aromatic double bonds derived from the vinyl aromatic compound are hydrogenated. The hydrogenation ratio of the above-mentioned hydrogenated block copolymer can be easily measured by infrared spectral analysis or nuclear magnetic resonance analysis.

[Producing Method of Hydrogenated Block Copolymer (a-2)]

For the hydrogenated block copolymer (a-2), for example, the block copolymer of the vinyl aromatic compound—the conjugated diene compound before hydrogenation can be synthesized in the inactive solvent using the lithium catalyst as in the method described in Japanese Patent Publication No. 40-23798.

The crystal melting heat quantity (ΔH) of the hydrogenated block copolymer (a-2) can be adjusted by setting the peak temperature of the internal temperature of the reactor and the difference between the maximum temperature and the minimum temperature in the reactor in polymerizing the polymer block B comprising conjugated diene as a main component to the specific range.

Specifically, when a temperature width (ΔT) which is the difference between the maximum temperature and the minimum temperature in the reactor is 20° C. or less, the crystal melting heat quantity (ΔH) of the finally obtained hydrogenated block copolymer is reduced.

The peak temperature of the internal temperature of the reactor is preferably set to be 90° C. or less.

In order to set the peak temperature of the internal temperature of the reactor to be 90° C. or less and to set the temperature width (ΔT) in the reactor to be 20° C. or less, it is necessary to remove reaction heat by cooling.

Examples of the method for hydrogenating the block copolymer of the vinyl aromatic compound—the conjugated diene compound before hydrogenation synthesized as described above include those described in Japanese Patent Publication Nos. 42-8704 and 43-6636, and Japanese Patent Application Laid-Open Nos. 60-220147, 61-33132 and 62-207303.

In that case, the hydrogenation is adjusted so that 80% or more, and preferably 90% or more of aliphatic double bonds derived from the conjugated diene compound is hydrogenated. On the other hand, the hydrogenation is adjusted so that less than 20%, and preferably less than 10% of aromatic double bonds derived from the vinyl aromatic compound is hydrogenated.

The hydrogenation ratio of the above-mentioned hydrogenated block copolymer can be easily measured by infrared spectral analysis or nuclear magnetic resonance analysis.

[Component (b)]

The component (b) is a polypropylene resin.

The elastomer composition contains the polypropylene resin to enhance the heat resistance and moldability of the elastomer composition.

As the polypropylene resin, a propylene homopolymer and/or a copolymer of propylene and α-olefin having 2 to 8 carbon atoms can be employed.

In the case of the copolymer of propylene and α-olefin having 2 to 8 carbon atoms, Examples of the α-olefin in the copolymer include ethylene, 1-butene, isobutene, 1-pentene, 1-hexene, 4-methyl-1-pentene and 1-octene. The ratio of the α-olefin is preferably 30% by mass or less.

These polypropylene resins can be produced by a hitherto publicly known method. For example, a synthesizing method using a Ziegler-Natta catalyst, or the like can be used.

The melt flow rate of the polypropylene resin (b) is 5 g/10 minutes or more and 100 g/10 minutes or less, and preferably 10 g/10 minutes or more and 60 g/10 minutes or less. The melt flow rate is a value measured at 230° C. under a load of 2.16 kg in accordance with ASTM D1238, and hereinafter, may be abbreviated to MFR.

When the MFR of the polypropylene resin (b) are less than 5 g/10 minutes, the melt viscosity of the elastomer composition tends to be increased, and the molding processability (flowability) of the elastomer composition tends to be reduced. Also, the outer appearance of a molded article tends to be degraded (a flow mark tends to be generated).

When the MFR is more than 100 g/10 minutes, the strength and heat resistance of the elastomer composition tend to be reduced.

The polypropylene resin (b) preferably has a bending elastic modulus of 800 MPa or more, more preferably has 900 MPa or more, and still more preferably 1000 MPa or more.

When the bending elastic modulus of the polypropylene resin (b) is less than 800 MPa, the hardness and heat resistance of the elastomer composition tend to be reduced.

When the amount of the hydrogenated block copolymer mixture as the component (a) described above is 100 parts by mass, the blending amount of the polypropylene resin (b) is 30 to 125 parts by mass, and preferably 55 to 100 parts by mass.

When the blending amount of the polypropylene resin (b) is less than 30 parts by mass, the heat resistance and molding processability (flowability) of the elastomer composition tends to be reduced, and the outer appearance of a molded article tends to be degraded (a flow mark tends to be generated). On the other hand, when the blending amount of the polypropylene resin (b) is more than 125 parts by mass, the flexibility of the elastomer composition tends to be reduced.

[Component (c)]

The component (c) is a hydrocarbon oil.

The elastomer composition comprises the hydrocarbon oil to tend to enhance the flexibility and processability of the elastomer composition.

As the hydrocarbon oil, a non-aromatic mineral oil, and a liquid or low molecular weight synthetic softening agent are preferable.

A paraffin oil and a naphthene oil which are generally known can be used as the non-aromatic mineral oil. The paraffin oil having an aromatic ring component of 10% by mass or less is particularly preferable.

When the amount of the hydrogenated block copolymer mixture (a) described above is 100 parts by mass, the blending amount of the hydrocarbon oil is 0 to 60 parts by mass, preferably 5 to 50 parts by mass, and more preferably 10 to 40 parts by mass.

When the blending amount of the hydrocarbon oil is more than 60 parts by mass, the scratch resistance and heat resistance of the elastomer composition tends to be reduced.

[Other Components]

The elastomer composition of the present embodiment may comprise an olefin elastomeric polymer if needed.

Examples of the olefin elastomeric polymer include a copolymer of ethylene or propylene and other monomer copolymerizable therewith such as an ethylene-propylene copolymer, an ethylene-propylene-butylene copolymer, an ethylene-butylene copolymer, an ethylene-hexene copolymer, an ethylene-octene copolymer, an ethylene-vinyl acetate copolymer and a hydrolysate thereof, a copolymer of ethylene and an acrylate, a copolymer of ethylene and a methacrylate, ethylene-acrylic acid ionomer, chlorinated polyethylene, a propylene-butylene copolymer, a propylene-hexene copolymer, a propylene-octene copolymer, a copolymer of propylene and an acrylate, a copolymer of propylene and a methacrylate and chlorinated polypropylene; annular olefin polymers such as an ethylene-norbornene copolymer; and a polybutene polymer.

Those comprised in the polypropylene resin as the component (b) described above are excluded from the above-mentioned olefin elastomeric polymer.

Examples of the acrylate which is the above-mentioned monomer copolymerizable with ethylene or propylene include an ester of acrylic acid and alcohol or glycidyl alcohol or the like having 1-24 carbon atoms, such as methyl acrylate, ethyl acrylate, propyl acrylate, butyl acrylate, pentyl acrylate and hexyl acrylate.

Examples of the methacrylate include an ester of methacrylic acid and alcohol or glycidyl alcohol or the like having 1-24 carbon atoms, such as methyl methacrylate, ethyl methacrylate, propyl methacrylate, butyl methacrylate, pentyl methacrylate and hexyl methacrylate.

Furthermore, the elastomer composition of the present embodiment may comprise a functional group-modified polymer.

Examples of the functional group-modified polymer include functional group-modified materials of a styrene-butadiene copolymer, a styrene-isoprene copolymer, a styrene-isoprene/butadiene copolymer and a hydrogenated material thereof, and a functional group-modified polymer of an olefin polymer.

Examples of the position of the functional group include a terminal end of a polymer to which the functional group is bonded, and a polymer molecule chain into which the functional group is grafted.

Examples of the functional group include a hydroxyl group, an amino group, a carboxyl group, an acid anhydride group, an epoxy group, an isocyanate group and a silanol group.

Furthermore, the elastomer composition of the present embodiment may comprise an inorganic filler, a stabilizer, a lubricant, a colorant, a silicone oil and a fire retardant or the like if needed.

Examples of the inorganic filler include calcium carbonate, talc, magnesium hydroxide, mica, barium sulfate, silic acid (white carbon), titanium oxide and carbon black.

Examples of the stabilizer include a hindered phenol antioxidant, a phosphorus heat stabilizer, a hindered amine light stabilizer and a benzotriazole UV absorbent.

Examples of the lubricant include stearic acid, stearate ester, and a metal salt of stearic acid.

Examples of the colorant include pigments such as carbon black and titanium oxide.

It is preferable that the silicone oil has a kinetic viscosity of 90 cst or more at 25° C.

Examples of the fire retardant include halogen compounds such as a bromine compound and a chlorine compound, a phosphorus compound, and an inorganic compound. Examples of the chlorine compound include chlorinated polyethylene and perchlorocyclopentadecane. Examples of the bromine compound include hexabromobenzene, decabromodiphenyl oxide, polydibromophenylene oxide, dibromoethyldibromocyclohexane, a tetrabromobisphenol derivative, tetradecabromodiphenoxybenzene, 2,2-bis(4-hydroxy-3,5-dibromophenyl)propane, tribromostyrene, hexabromocyclododecane, a brominated epoxy resin, an aromatic bromine compound and brominated polystyrene. Examples of the phosphorus compound include trischloroethyl phosphate, tristribromophenyl phosphate, tristribromoneopentyl phosphate, an aromatic condensed phosphoric ester, a halogen-containing condensed phosphoric ester, ammonium polyphosphate, a melamine phosphate, a red phosphorus fire retardant. Examples of the inorganic compound include metal hydroxides such as magnesium hydroxide, aluminum hydroxide and calcium hydroxide, metal oxides such as zinc borate and barium borate, calcium carbonate, clay, basic magnesium carbonate and hydrotalcite.

[Producing Method of Elastomer Composition]

Conventionally known methods for blending polymer components can be used as a producing method of the elastomer composition of the present embodiment.

Preferable Examples of the methods include a method for carrying out melting and kneading using various kinds of kneading machines such as a mixing roll, a kneader, a bumbury's mixer and an extruder, which are ordinarily used, in order to obtain the most homogeneous blend material.

As a previous step prior to carrying out melting and kneading, a predetermined blend is previously dry-blended using mixers such as a Henschel mixer, a tumbler and a ribbon blender. The mixture is melted and kneaded, and thereby, a homogeneous elastomer composition can be obtained.

The operation method for melting and kneading is not particularly limited. As the operation method, there is exemplified a method of melting and kneading a blend of the hydrogenated block copolymer mixture (a), the polypropylene resin (b), the hydrocarbon oil (c) and other predetermined components, or a method of mixing the hydrogenated block copolymer mixture (a), the hydrocarbon oil (c) and/or other predetermined components first, followed by adding the polypropylene resin (b) to the obtained mixture in a post process, and melting and kneading the mixture.

[Producing Method of Molded Body Made of Elastomer Composition]

As a molding method of the elastomer composition of the present embodiment, any of injection molding, extrusion molding and compression molding or the like can be applied. The injection molding is particularly preferable since it has excellent moldability.

When the injection molding is carried out, an ordinary plastic molding machine can be used, and thereby, an injection-molded article is obtained for a short time.

[Storage Cover of Airbag Devices]

The elastomer composition of the present embodiment is suitable as a material for the storage cover of airbag devices.

The storage cover of airbag devices can be produced by an injection molding method.

Specifically, the elastomer composition is supplied into an injection molding machine provided with a predetermined mold for forming the storage cover of airbag devices, and is injection-molded by the injection molding machine. Thereby, the storage cover of airbag devices can be produced in a short time.

Since the elastomer composition of the present embodiment has excellent heat stability, the elastomer composition has an advantage that the elastomer composition remaining in a sprue part and a runner part can be reused in the following line.

In order that the storage cover of airbag devices can be certainly deployed to instantaneously release an airbag, a predetermined tear line designed previously is preferably provided in the storage cover.

The tear line is designed in an H-shape, a U-shape or the like in consideration of a passenger's position, the installed position of the airbag device, the releasing direction of the airbag and the shape of the cover or the like. It is preferable that the tear line forms a V-shaped groove, a U-shaped groove or the like so as to correspond to a predicted breakage portion, and has a thickness thinner than those of other portions.

The storage cover of airbag devices is economically and advantageously produced by single-layer molding by the injection molding method. However, the storage cover may be compounded with other plastic material in order to reinforce a mounting part and enhance the stiffness of the molded article.

In the case of compounding, an injection multilayer molding method and a bonding method using an adhesive can be used. Since the elastomer composition of the present embodiment has excellent outer appearance characteristics and scratch resistance, the elastomer composition is suitable as an outer layer material.

EXAMPLES

Hereinafter, the present invention will be specifically described in further detail by way of Examples and Comparative Examples, although the present invention is not limited to the following Examples.

The physical properties of Examples and Comparative Examples were measured and evaluated according to the following items.

(1) Hardness [−]

The hardness was measured at 23° C. according to JIS K6301 using type A.

(2) Tensile Strength [MPa]

The tensile strength was measured using dumbbell No. 3 and a press sheet having a thickness of 2 mm as a sample according to JIS K6301.

(3) Elongation [%]

The elongation was measured using dumbbell No. 3 and a press sheet having a thickness of 2 mm as a sample according to JIS K6301.

(4) Bending Elastic Modulus [MPa]

The bending elastic modulus was measured at a bending speed of 2 mm/min according to JIS K7203.

(5) Tear Strength [MPa]

The tear strength was measured by using a press sheet having a thickness of 2 mm as a sample according to JIS K6252 using an angle type without cutting.

(6) Melt Flow Rate (MFR) [g/10 minutes]

The melt flow rate was measured at 230° C. under a load of 2.16 kg according to ASTM D1238.

(7) Scratch Resistance, Gloss Retention Rate [%]

A flat plate having a smooth surface was prepared by the injection molding method using elastomer compositions of Examples and Comparative Examples to be described later.

The flat plate was placed horizontally, and a cotton fabric to which a load of 40 g/cm$^2$ was applied, was put thereon and moved back and forth 100 times on the plate. From the gloss value of the abraded surface measured by the method according to JIS K7105 (E1) and the gloss value before abrading (E0), a retention rate (E1/E0) 100(%) was calculated.

(8) Molding Processability and Outer Appearance

A storage cover of airbag devices for driver seats was molded according to the following conditions by an injection molding machine (trade name: EF120S18A, manufactured by Nissei Plastic Industrial Co., Ltd.) using elastomer compositions of Examples and Comparative Examples to be described later. The storage cover has a thickness of 5 mm, a predicted breakage portion (tear line) having a thickness of 0.5 mm, and a hinge portion having a thickness of 2.5 mm.

Cylinder Temperatures

C1 (a front stage part of the injection molding machine): 180° C.,

C2 (a middle stage part of the injection molding machine): 190° C.,

C3 (a back stage injecting part): 190° C.,

Nozzle Temperature: 200° C.,

Injecting Speed: a low speed,

Mold Temperature: 40° C.

The outer appearances such as a flow mark and gloss of the molded body were visually observed. A good molded body was defined as ○; a slightly insufficient molded body, Δ; and an insufficient molded body, x.

(9) Deployment Performance of Storage Cover (Low-Temperature Characteristics)

A storage cover was molded using elastomer compositions of Examples and Comparative Examples to be described later.

Then, an airbag and the storage cover were mounted to an iron bracket (retainer). Furthermore, a gas generator was mounted to assemble an airbag device.

Next, this airbag device was put into an air constant temperature reservoir having a temperature of −40° C. as a deployment temperature. After the inner temperature of the reservoir was stabilized, the airbag device was further left for 1 hour. Then, the airbag device was taken out. The airbag device was mounted to a support, energized, and deployed. At this time, the airbag device was energized within 1 minute after the airbag device was taken out from the constant temperature reservoir.

When only 95% or more of the predicted breakage portion of the storage cover was cleaved without generating a broken piece, and the airbag was deployed, the deploying properties of the storage cover were evaluated as ○ (good). When a slightly unpredicted portion of the storage cover was cleaved and a small amount of broken pieces were scattered, the deploying properties thereof were evaluated as Δ (fair). When the cleavage was insufficient, the deploying properties thereof were evaluated as x (poor).

(10) Number Average Molecular Weight

The number average molecular weight of components (a-1) and (a-2) to be described later was measured by GPC (apparatus: Tosoh Corp., HLC-8220; column: TSKgel SuperH-RC×two columns.

Tetrahydrofuran was used as a solvent. A temperature as the measuring condition was 35° C.

The number average molecular weight in terms of polystyrene was determined using a calibration curve prepared using commercially available standard polystyrenes of which number average molecular weights are known.

(11) Styrene Content

The styrene content of the components (a-1) and (a-2) was measured using an ultraviolet spectrophotometer (UV-2450 manufactured by Shimadzu Corporation).

(12) 1,2-Vinyl Bond Content and Hydrogenation Ratio

The 1,2-vinyl bond content and hydrogenation ratio of the components (a-1) and (a-2) were measured using a nuclear magnetic resonance apparatus (DPX-400 manufactured by BRUKER).

(13) Crystal Melting Heat Quantity (ΔH)

The crystal melting heat quantity (ΔH) of the component (a-2) was calculated by measuring a DSC curve at a temperature rise rate of 10° C./min using 7Series Thermal Analysis System manufactured by PERKIN-ELMER, and determining a peak area.

A hydrogenated block copolymer obtained by sufficiently promoting crystallization after melting and molding was used as a sample of the hydrogenated block copolymer for measuring the DSC curve.

Next, the elastomer composition to be measured and evaluated as described above will be described.

As follows, Character "A" denotes a polymer block comprising a vinyl aromatic compound as a main component, and Character "B" denotes a polymer block comprising a conjugated diene compound as a main component.

[Component (a-1)]

((a-1)-1)

A hydrogenated styrene-butadiene block copolymer was synthesized as follows, which had a structure of A-B-A, a number average molecular weight of 270,000, a styrene content of 31% by mass, a 1,2-vinyl bond content of polybutadiene parts before hydrogenation of 38 mol %, and a hydrogenation ratio of polybutadiene parts of 99%.

0.05 phr (per hundred rubber) of n-butyllithium was added as a polymerization initiator. 0.3 equivalent/lithium of tetramethylethylene diamine was added as a regulant for 1,2-vinyl bond content in a cyclohexane solvent. The internal temperature of a reactor was set to 60° C. Styrene and butadiene were anionblock-copolymerized in order of styrene, butadiene and styrene to prepare a styrene-butadiene block copolymer by adiabatic polymerization.

Next, the obtained styrene-butadiene block copolymer was hydrogenated at hydrogen pressure of 5 kg/cm$^2$ at 70° C. using bis($\eta^5$-cyclopentadienyl)titanium dichloride and n-butyllithium as a hydrogenation catalyst.

((a-1)-2)

A hydrogenated styrene-isoprene block copolymer was synthesized as follows, which had a structure of A-B-A, a number average molecular weight of 290,000, a styrene content of 28% by mass, a 1,4-bond content of polyisoprene parts before hydrogenation of 94 mol % and a 3,4-bond content of 6 mol %, and a hydrogenation ratio of polyisoprene part of 99%. 0.047 phr (per hundred rubber) of n-butyllithium was added as a polymerization initiator. 0.05 equivalent/lithium of tetramethylethylene diamine was added in a cyclohexane solvent. Styrene and isoprene were anionblock-copolymerized in order of styrene, isoprene and styrene to prepare a styrene-isoprene block copolymer by adiabatic polymerization.

Next, the obtained styrene-isoprene block copolymer was hydrogenated at hydrogen pressure of 5 kg/cm$^2$ at 70° C. using bis($\eta^5$-cyclopentadienyl)titanium dichloride and n-butyllithium as a hydrogenation catalyst.

((a-1)-3)

A hydrogenated styrene-butadiene block copolymer was synthesized as follows, which had a structure of A-B-A, a number average molecular weight of 260,000, a styrene content of 30% by mass, a 1,2-vinyl bond content of polybutadiene parts before hydrogenation of 18 mol %, and a hydrogenation ratio of polybutadiene parts of 99%.

0.046 phr (per hundred rubber) of n-butyllithium was added as a polymerization initiator. 0.12 equivalent/lithium of tetramethylethylene diamine was added in a cyclohexane solvent. Styrene and butadiene were anion-block-copolymerized in order of styrene, butadiene and styrene to prepare a styrene-butadiene block copolymer by adiabatic polymerization.

Next, the obtained styrene-butadiene block copolymer was hydrogenated at hydrogen pressure of 5 kg/cm$^2$ at 70° C. using bis($\eta^5$-cyclopentadienyl)titanium dichloride and n-butyllithium as a hydrogenation catalyst.

TABLE 1

| | (a-1) | | |
|---|---|---|---|
| | a-1-1 | a-1-2 | a-1-3 |
| Structure | S-EB-S | S-EP-S | S-EB-S |
| Styrene content (% by mass) | 31 | 28 | 30 |
| Molecular weight | 270000 | 290000 | 260000 |
| Vinyl content (mol %) | 38 | 6 | 18 |
| Hydrogenation ratio (%) | 99 | 99 | 99 |

[Component (a-2)]
((a-2)-1)

A hydrogenated styrene-butadiene block copolymer was synthesized as follows, which had a structure of A-B-A, a number average molecular weight of 85,000, a styrene content of 21% by mass, a 1,2-vinyl bond content of polybutadiene parts before hydrogenation of 51 mol %, a hydrogenation ratio of polybutadiene parts of 99%, an MFR of 12 g/10 minutes, and a crystal melting heat quantity ΔH of 0.03 J/g.

0.125 phr (per hundred rubber) of n-butyllithium was added as a polymerization initiator. 0.45 equivalent/lithium of tetramethylethylene diamine was added as a regulant for 1,2-vinyl bond content in a cyclohexane solvent. Styrene and butadiene were anion-block-copolymerized in order of styrene, butadiene and styrene to prepare a styrene-butadiene block copolymer.

Cooling was carried out in order to remove reaction heat in the polymerization of butadiene to control the peak temperature of the internal temperature of the reactor to 78° C.

A temperature width (ΔT) which is the difference between the maximum temperature and the minimum temperature in the reactor during the polymerization of butadiene was controlled to 8° C.

When the peak temperature was reduced, or the temperature width (ΔT) was narrowed, techniques of reducing a concentration in the reaction system of a butadiene monomer along with cooling; and reducing the supply rate of the butadiene monomer, or the like were employed.

Next, the obtained styrene-butadiene block copolymer was hydrogenated at hydrogen pressure of 5 kg/cm$^2$ at 70° C. using bis($\eta^5$-cyclopentadienyl)titanium dichloride and n-butyllithium as a hydrogenation catalyst.

((a-2)-2)

The amount used of the polymerization initiator was changed to 0.109 phr, and the added styrene content was changed. The other conditions were the same as those of the above-mentioned component (a-2)-1. Therefore, a hydrogenated styrene-butadiene block copolymer was produced, which had a structure of A-B-A, a number average molecular weight of 102,000, a styrene content of 18% by mass, a 1,2-vinyl bond content of polybutadiene parts before hydrogenation of 52 mol %, a hydrogenation ratio of polybutadiene parts of 99%, an MFR of 4.3 g/10 minutes, and a crystal melting heat quantity (ΔH) of 0.02 J/g.

((a-2)-3)

0.50 equivalent/lithium of tetramethylethylene diamine was added as a regulant for 1,2-vinyl bond content. The other conditions were the same as those of the above-mentioned component (a-2)-2. Therefore, a hydrogenated styrene-butadiene block copolymer was produced, which had a structure of A-B-A, a number average molecular weight of 101,000, a styrene content of 18% by mass, a 1,2-vinyl bond content of polybutadiene parts before hydrogenation of 56 mol %, a hydrogenation ratio of polybutadiene parts having of 99%, an MFR of 4.5 g/10 minutes, and a crystal melting heat quantity (ΔH) of 0.01 J/g.

((a-2)-4)

The amount used of the polymerization initiator was changed to 0.110 phr. The amount used of the regulant for 1,2-vinyl bond content was changed to 0.34 equivalent/lithium. The temperature width (ΔT) during the polymerization of butadiene was set to 20° C. The other conditions were the same as those of the above-mentioned component (a-2)-1. Therefore, a hydrogenated styrene-butadiene block copolymer was produced, which had a structure of A-B-A, a number average molecular weight of 99,000, a styrene content of 20% by mass, a 1,2-vinyl bond content of polybutadiene parts having of 35 mol %, a hydrogenation ratio of polybutadiene parts of 99%, an MFR of 3.3 g/10 minutes, and a crystal melting heat quantity (ΔH) of 1.13 J/g.

((a-2)-5)

The amount used of the polymerization initiator was changed to 0.067 phr. The other conditions were the same as those of the above-mentioned component (a-2)-1. Therefore, a hydrogenated styrene-butadiene block copolymer was produced, which had a structure of A-B-A, a number average molecular weight of 170,000, a styrene content of 21% by mass, a 1,2-vinyl bond content of polybutadiene parts before hydrogenation of 47 mol %, a hydrogenation ratio of polybutadiene parts of 99%, and a crystal melting heat quantity (ΔH) of 0.02 J/g. The MFR could not be measured since the copolymer did not flow.

((a-2)-6)

The amount used of the polymerization initiator was changed to 0.115 phr. 0.80 equivalent/lithium of tetramethylethylene diamine was added as a regulant for 1,2-vinyl bond content. The peak temperature in the reactor was set to 73° C.

The other conditions were the same as those of the above-mentioned component (a-2)-1. Therefore, a hydrogenated styrene-butadiene block copolymer was produced, which had a structure of A-B-A, a number average molecular weight of 92,000, a styrene content of 21% by mass, a 1,2-vinyl bond content of polybutadiene parts before hydrogenation of 65 mol %, a hydrogenation ratio of polybutadiene parts of 99%, a crystal melting heat quantity (ΔH) of 0.01 J/g, and an MFR of 7.6 g/10 minutes.

((a-2)-7)

The amount used of the polymerization initiator was changed to 0.117 phr. 0.44 equivalent/lithium of tetramethylethylene diamine was added as a regulant for 1,2-vinyl bond content.

The other conditions were the same as those of the above-mentioned component (a-2)-4. Therefore, a hydrogenated styrene-butadiene block copolymer was produced, which had a structure of A-B-A, a number average molecular weight of 88,000, a styrene content of 20% by mass, a 1,2-vinyl bond content of a polybutadiene parts before hydrogenation of 43 mol %, a hydrogenation ratio of polybutadiene parts of 99%, a crystal melting heat quantity (ΔH) of 0.65 J/g, and an MFR of 6.8 g/10 minutes.

((a-2)-8)

The amount used of the polymerization initiator was changed to 0.115 phr. 0.66 equivalent/lithium of tetramethylethylene diamine was added as a regulant for 1,2-vinyl bond content. The temperature width (ΔT) during the polymerization of butadiene was set to 45° C. The peak temperature in the reactor was set to 95° C.

The other conditions were the same as those of the above-mentioned component (a-2)-1. Therefore, a hydrogenated styrene-butadiene block copolymer was produced, which had a structure of A-B-A, a number average molecular weight of 91,000, a styrene content of 20% by mass, a 1,2-vinyl bond content of polybutadiene parts before hydrogenation of 51 mol %, a hydrogenation ratio of polybutadiene parts of 99%, an MFR of 5.7 g/10 minutes, and a crystal melting heat quantity (ΔH) of 0.71 J/g.

((a-2)-9)

The amount used of the polymerization initiator was changed to 0.115 phr. 0.5 equivalent/lithium of tetramethylethylene diamine was added as a regulant for 1,2-vinyl bond content. The temperature width (ΔT) during the polymerization of butadiene was set to 18° C.

The other conditions were the same as those of the above-mentioned component (a-2)-1. Therefore, a hydrogenated styrene-butadiene block copolymer was produced, which had a structure of A-B-A, a number average molecular weight of 90,000, a styrene content of 20% by mass, a 1,2-vinyl bond content of polybutadiene parts before hydrogenation of 51 mol %, a hydrogenation ratio of polybutadiene parts having of 99%, an MFR of 7.4 g/10 minutes, and a crystal melting heat quantity ($\Delta H$) of 0.15 J/g.

((a-2)-10)

The amount used of the polymerization initiator was changed to 0.112 phr. 0.42 equivalent/lithium of tetramethylethylene diamine was added as a regulant for 1,2-vinyl bond content. The temperature width ($\Delta T$) during the polymerization of butadiene was set to 6° C.

The other conditions were the same as those of the above-mentioned component (a-2)-1. Therefore, a hydrogenated styrene-butadiene block copolymer was produced, which had a structure of A-B-A, a number average molecular weight of 95,000, a styrene content of 20% by mass, a 1,2-vinyl bond content of polybutadiene parts before hydrogenation of 45 mol %, a hydrogenation ratio of polybutadiene parts of 99%, an MFR of 4.1 g/10 minutes, and a crystal melting heat quantity ($\Delta H$) of 0.13 J/g.

((a-2)-11)

The amount used of the polymerization initiator was changed to 0.112 phr. 0.46 equivalent/lithium of tetramethylethylene diamine to lithium was added as a regulant for 1,2-vinyl bond content. The temperature width ($\Delta T$) during the polymerization of butadiene was set to 18° C.

The other conditions were the same as those of the above-mentioned component (a-2)-1. Therefore, a hydrogenated styrene-butadiene block copolymer was produced, which had a structure of A-B-A, a number average molecular weight of 93,000, a styrene content of 20% by mass, a 1,2-vinyl bond content of polybutadiene parts before hydrogenation of 47 mol %, a hydrogenation ratio of a polybutadiene parts of 99%, an MFR of 5.1 g/10 minutes, and a crystal melting heat quantity ($\Delta H$) of 0.25 J/g.

((a-2)-12)

The amount used of the polymerization initiator was changed to 0.124 phr. 0.78 equivalent/lithium of tetramethylethylene diamine was added as a regulant for 1,2-vinyl bond content. The temperature width ($\Delta T$) during the polymerization of butadiene was set to 34° C. The peak temperature in the reactor was set to 90° C.

The other conditions were the same as those of the above-mentioned component (a-2)-1. Therefore, a hydrogenated styrene-butadiene block copolymer was produced, which had a structure of A-B-A, a number average molecular weight of 84,000, a styrene content of 20% by mass, a 1,2-vinyl bond content of polybutadiene parts before hydrogenation of 55 mol %, a hydrogenation ratio of polybutadiene parts of 99%, an MFR of 5.6 g/10 minutes, and a crystal melting heat quantity ($\Delta H$) of 0.33 J/g.

((a-2)-13)

The amount used of the polymerization initiator was changed to 0.115 phr. 0.36 equivalent/lithium of tetramethylethylene diamine was added as a regulant for 1,2-vinyl bond content. The temperature width ($\Delta T$) during the polymerization of butadiene was set to 5° C.

The other conditions were the same as those of the above-mentioned component (a-2)-1. Therefore, a hydrogenated styrene-butadiene block copolymer was produced, which had a structure of A-B-A, a number average molecular weight of 89,000, a styrene content of 20% by mass, a 1,2-vinyl bond content of polybutadiene parts before hydrogenation of 36 mol %, a hydrogenation ratio of polybutadiene parts of 99%, an MFR of 8.2 g/10 minutes, and a crystal melting heat quantity ($\Delta H$) of 0.16 J/g.

TABLE 2

| | (a-2) | | | | | | |
|---|---|---|---|---|---|---|---|
| | a-2-1 | a-2-2 | a-2-3 | a-2-4 | a-2-5 | a-2-6 | a-2-7 |
| Structure | S-EB-S | S-EB-S | S-EB-S | S-EB-S | S-EB-S | S-EB-S | S-EB-S |
| $\Delta T$ (° C.) | 8 | 8 | 8 | 20 | 8 | 5 | 20 |
| Styrene content (% by mass) | 21 | 18 | 18 | 20 | 21 | 21 | 20 |
| Molecular weight | 85000 | 102000 | 101000 | 99000 | 170000 | 92000 | 88000 |
| Vinyl content (mol %) | 51 | 52 | 56 | 35 | 47 | 65 | 43 |
| Hydrogenation ratio (%) | 99 | 99 | 99 | 99 | 99 | 99 | 99 |
| $\Delta H$ (J/g) | 0.03 | 0.02 | 0.01 | 1.13 | 0.07 | 0.01 | 0.65 |
| MFR (g/10 minutes) | 12 | 4.3 | 4.5 | 3.3 | Incapable of measurement | 7.6 | 6.8 |

TABLE 2-continued

|  | (a-2) | | | | | |
| --- | --- | --- | --- | --- | --- | --- |
|  | a-2-8 | a-2-9 | a-2-10 | a-2-11 | a-2-12 | a-2-13 |
| Structure | S-EB-S | S-EB-S | S-EB-S | S-EB-S | S-EB-S | S-EB-S |
| ΔT (° C.) | 45 | 18 | 6 | 18 | 34 | 5 |
| Styrene content (% by mass) | 20 | 19 | 20 | 20 | 19 | 19 |
| Molecular weight | 91000 | 90000 | 95000 | 93000 | 84000 | 89000 |
| Vinyl content (mol %) | 51 | 51 | 45 | 47 | 55 | 36 |
| Hydrogenation ratio (%) | 99 | 99 | 99 | 99 | 99 | 99 |
| ΔH (J/g) | 0.71 | 0.17 | 0.13 | 0.25 | 0.33 | 0.16 |
| MFR (g/10 minutes) | 5.7 | 7.4 | 4.1 | 4.7 | 5.6 | 8.2 |

[Component (b)]

MA03 manufactured by Japan Polychem Corporation (homopolypropylene, MFR: 25 g/10 minutes, bending elastic modulus: 1300 MPa) was used.

[Component (c)]

A paraffin oil (Diana process oil PW-90, kinetic viscosity: 90 cSt) manufactured by Idemitsu Kosan Co., Ltd. was used.

Examples 1 to 9

The hydrogenated block copolymers (a-1), (a-2) shown in the following Table 3, and the polyolefin resin (b) and the hydrocarbon oil (c) described above were used. These were blended in the blending ratio of 25 parts by mass of the hydrogenated block copolymer (a-1), 40 parts by mass of the hydrogenated block copolymer (a-2), 50 parts by mass of the polyolefin resin (b), and 20 parts by mass of the hydrocarbon oil (c) in a Henschel mixer.

Then, the obtained mixture was melted and kneaded at 220° C. using a same direction twin-screw kneader having a diameter of 45 mm to obtain a pellet made of an elastomer composition.

Next, the pellet made of this elastomer composition was injection-molded to obtain a plurality of storage covers of airbag devices for driver seats. The storage covers were estimated according to the above-mentioned test methods.

The physical properties of the elastomer compositions and the evaluation results of molded articles (storage covers of airbag devices) are shown in the following Table 3.

Reference Example 1, Examples 10 and 11, Comparative Examples 1 to 3

The hydrogenated block copolymers (a-1), (a-2) shown in the following Table 4, and the polyolefin resin (b) and the hydrocarbon oil (c) described above were used. These were blended in the blending ratio of 25 parts by mass of the hydrogenated block copolymer (a-1), 40 parts by mass of the hydrogenated block copolymer (a-2), 50 parts by mass of the polyolefin resin (b), and 20 parts by mass of the hydrocarbon oil (c) in a Henschel mixer.

Then, the obtained mixture was melted and kneaded at 220° C. using a same direction twin-screw kneader having a diameter of 45 mm to obtain a pellet made of an elastomer composition.

Next, the pellet made of this elastomer composition was injection-molded to obtain a plurality of storage covers of airbag devices for driver seats. The storage covers were evaluated according to the above-mentioned test methods.

The physical properties of the elastomer compositions and the evaluation results of molded articles (storage covers of airbag devices) are shown in the following Table 4.

TABLE 3

|  |  | Example 1 | Example 2 | Example 3 | Example 4 | Example 5 | Example 6 | Example 7 | Example 8 | Example 9 |
| --- | --- | --- | --- | --- | --- | --- | --- | --- | --- | --- |
| Block copolymer | (a-1) | (a-1)-1 | (a-1)-1 | (a-1)-2 | (a-1)-3 | (a-1)-1 | (a-1)-1 | (a-1)-1 | (a-1)-1 | (a-1)-1 |
|  | (a-2) | (a-2)-1 | (a-2)-2 | (a-2)-2 | (a-2)-1 | (a-2)-3 | (a-2)-9 | (a-2)-10 | (a-2)-11 | (a-2)-12 |
| Physical properties of composition | MFR | 7.1 | 5.5 | 5.7 | 7.4 | 5.4 | 6.6 | 5.1 | 5.2 | 6.2 |
|  | Hardness | 91 | 93 | 92 | 88 | 92 | 95 | 92 | 94 | 97 |
|  | Tensile strength (MPa/cm$^2$) | 11.5 | 12.6 | 12.5 | 9.6 | 12.4 | 13.3 | 13.1 | 13.3 | 13.6 |
|  | Elongation (%) | 650 | 680 | 610 | 620 | 660 | 590 | 600 | 585 | 570 |
|  | Bending elastic modulus (MPa/cm$^2$) | 148 | 167 | 172 | 132 | 161 | 176 | 166 | 171 | 173 |
|  | Tear strength (MPa/cm$^2$) | 6.0 | 7.1 | 6.4 | 5.7 | 6.8 | 6.9 | 6.7 | 6.5 | 6.6 |
| Physical properties of molded article | Scratch resistance; gloss retention rate (%) | 93 | 94 | 92 | 95 | 94 | 91 | 90 | 90 | 89 |
|  | Outer appearance | ○ | ○ | ○ | ○ | ○ | ○~Δ | ○~Δ | ○~Δ | ○~Δ |
|  | Molding processability | ○ | ○ | ○ | ○ | ○ | ○ | ○ | ○ | ○ |
|  | Low-temperature cover deployment performance | ○ | ○ | ○ | ○ | ○ | ○~Δ | ○~Δ | ○~Δ | ○~Δ |

TABLE 4

|  |  | Reference Example 1 | Comparative Example 1 | Comparative Example 2 | Example 10 | Example 11 | Comparative Example 3 |
|---|---|---|---|---|---|---|---|
| Block copolymer | (a-1) | (a-1)-1 | (a-1)-1 | (a-1)-1 | (a-1)-1 | (a-1)-1 | (a-1)-1 |
|  | (a-2) | (a-2)-4 | (a-2)-5 | (a-2)-6 | (a-2)-7 | (a-2)-8 | (a-2)-13 |
| Physical properties of composition | MFR | 4.1 | 0.3 | 6.8 | 6.2 | 5.6 | 7.7 |
|  | Hardness | 99 | 94 | 85 | 96 | 98 | 96 |
|  | Tensile strength (MPa/cm$^2$) | 14.5 | 19.3 | 9.7 | 13.1 | 142 | 12.9 |
|  | Elongation (%) | 530 | 480 | 720 | 580 | 540 | 590 |
|  | Bending elastic modulus (MPa/cm$^2$) | 236 | 212 | 131 | 182 | 191 | 173 |
|  | Tear strength (MPa/cm$^2$) | 6.4 | 8.1 | 6.4 | 7.0 | 7.2 | 7.1 |
| Physical properties of molded article | Scratch resistance; gloss retention rate (%) | 87 | 91 | 86 | 87 | 88 | 87 |
|  | Outer appearance | Δ | Δ~x | ○ | Δ | Δ | ○~Δ |
|  | Molding processability | Δ | x | ○ | ○ | ○ | ○ |
|  | Low-temperature cover deployment performance | Δ | Δ~x | Δ | Δ | Δ | Δ |

As is apparent from Table 3, the elastomer compositions of Examples 1 to 5 including the combination of two kinds of hydrogenated block copolymers (a-1)-1 to (a-1)-3 and (a-2)-1 to (a-2)-3, (a-2)-9 to (a-2)-12 which have specific structures and physical properties had excellent flexibility and strength. The molded articles using these elastomer compositions had sufficiently good characteristics in a practical use for any of scratch resistance, outer appearance characteristics, molding processability and low-temperature cover deployment performance.

On the other hand, as is apparent from Table 4, Reference Example 1 had an extremely high crystal melting heat quantity (ΔH). Thereby, resultingly, the molded article of the elastomer composition had outer appearance characteristics, molding processability and low-temperature cover deployment performance inferior to those of Examples 1 to 9.

In Comparative Example 1, the molecular weight of the component (a-2)-5 was too large. The molded article of the elastomer composition did not have practically good evaluation for outer appearance characteristics, molding processability, and low-temperature cover deployment performance.

In Comparative Example 2, the vinyl bond content in the conjugated diene compound before hydrogenation of the component (a-2)-6 was too high (65 mol %). Thereby, the elastomer composition had practically inferior scratch resistance. The elastomer composition had practically insufficient characteristics for tensile strength and a bending elastic modulus. Furthermore, resultingly, the molded article of the elastomer composition had inferior low-temperature cover deployment performance.

In Example 10, the temperature width (ΔT) during the polymerization of butadiene of the component (a-2)-7 was large. Resultingly, the molded article of the elastomer composition had outer appearance characteristics inferior to those of Examples 1 to 9. Since the crystal melting heat quantity (ΔH) was particularly large, resultingly, the molded article of the elastomer composition had slightly inferior low-temperature cover deployment performance.

In Example 11, the temperature width (ΔT) during the polymerization of butadiene of the component (a-2)-8 was large. Resultingly, the molded article of the elastomer composition had outer appearance characteristics inferior to those of Examples 1 to 9. Since the crystal melting heat quantity (ΔH) was particularly large, resultingly, the molded article of the elastomer composition had slightly inferior low-temperature cover deployment performance.

In Comparative Example 3, the vinyl bond content in the conjugated diene compound before hydrogenation of the component (a-2)-13 was too few (36 mol %), and the crystal melting heat quantity (ΔH) was high. Thereby, the elastomer composition had practically insufficient characteristics for scratch resistance. Resultingly, the molded article had inferior low-temperature cover deployment performance.

The present application claims priority on Patent Application (No. 2008-078826) filed in JAPAN on Mar. 25, 2008, the entire contents of which are hereby incorporated by reference.

Industrial Applicability

The thermoplastic elastomer composition of the present invention has characteristics of the hydrogenated block copolymer having excellent flexibility, weatherability, heat resistance, strength and molding processability. The thermoplastic elastomer composition provides the molded body having excellent outer appearance characteristics, scratch resistance and low-temperature characteristics. Thereby, the thermoplastic elastomer composition has industrial applicability as automobile interior parts such as the storage cover of airbag devices and an instrument panel.

The invention claimed is:

1. An elastomer composition comprising:
   (a) a hydrogenated block copolymer mixture comprising hydrogenated block copolymers (a-1) and (a-2): 100 parts by mass,
   (a-1):
   a hydrogenated block copolymer, obtained by hydrogenating a block copolymer comprising
      at least two polymer blocks A comprising a vinyl aromatic compound as a main component and
      at least one polymer block B comprising a conjugated diene compound as a main component,
      wherein a number average molecular weight is more than 200,000 and 400,000 or less, and a content of the polymer blocks A is 15 to 40% by mass: 10 to 60 parts by mass,
   (a-2):
   a hydrogenated block copolymer, obtained by hydrogenating a block copolymer comprising
      at least one polymer block A comprising a vinyl aromatic compound as a main component and
      at least one polymer block B comprising a conjugated diene compound as a main component,
      wherein a number average molecular weight is more than 30,000 and 140,000 or less, a content of the polymer block A is 10 to 25% by mass, a vinyl bond content in the conjugated diene compound before hydrogenation is 40 to 60 mol %, and the hydrogenated block copolymer (a-2) has a melt flow rate value (MFR) of 0.1 g/10 minutes or more and less than 30 g/10 minutes, as determined at 230° C. under a load of 2.16 kg in accordance with ASTM D1238: 40 to 90 parts by mass;

(b) a polypropylene resin having a melt flow rate value (MFR) of 5 g/10 minutes or more and 100 g/10 minutes or less, as determined at 230° C. under a load of 2.16 kg in accordance with ASTM D1238: 30 to 125 parts by mass; and (c) a hydrocarbon oil: 0 to 60 parts by mass, wherein a crystal melting heat quantity ($\Delta H$) of the hydrogenated block copolymer (a-2) is less than 0.5 J/g.

2. The elastomer composition according to claim 1, wherein the vinyl bond content in the conjugated diene compound before hydrogenation of the hydrogenated block copolymer (a-2) is more than 50 mol % and 60 mol % or less.

3. The elastomer composition according to claim 2, wherein the crystal melting heat quantity ($\Delta H$) of the hydrogenated block copolymer (a-2) is less than 0.1 J/g.

4. The elastomer composition according to claim 2, wherein the vinyl bond content in the conjugated diene compound before hydrogenation of the hydrogenated block copolymer (a-1) is less than 40 mol %.

5. The elastomer composition according to claim 2, wherein the polypropylene resin (b) is a propylene homopolymer and/or a copolymer of propylene and $\alpha$-olefin having 2 to 8 carbon atoms, each having a bending elastic modulus of 800 MPa or more.

6. The elastomer composition according to claim 1, wherein the crystal melting heat quantity ($\Delta H$) of the hydrogenated block copolymer (a-2) is less than 0.1 J/g.

7. The elastomer composition according to claim 1, wherein the vinyl bond content in the conjugated diene compound before hydrogenation of the hydrogenated block copolymer (a-1) is less than 40 mol %.

8. The elastomer composition according to claim 1, wherein the polypropylene resin (b) is a propylene homopolymer and/or a copolymer of propylene and $\alpha$-olefin having 2 to 8 carbon atoms, each having a bending elastic modulus of 800 MPa or more.

9. A storage cover of airbag devices made of the elastomer composition according to claim 8.

10. A storage cover of airbag devices made of the elastomer composition according to claim 1.

* * * * *